US012349842B2

(12) United States Patent
Saint

(10) Patent No.: US 12,349,842 B2
(45) Date of Patent: Jul. 8, 2025

(54) SKIMMER LADLE

(71) Applicant: Al Saint, Daytona Beach, FL (US)

(72) Inventor: Al Saint, Daytona Beach, FL (US)

( * ) Notice: Subject to any disclaimer, the term of this patent is extended or adjusted under 35 U.S.C. 154(b) by 571 days.

(21) Appl. No.: 17/858,267

(22) Filed: Jul. 6, 2022

(65) Prior Publication Data

US 2023/0029824 A1 Feb. 2, 2023

Related U.S. Application Data

(63) Continuation-in-part of application No. 17/387,043, filed on Jul. 28, 2021, now Pat. No. 11,627,840.

(51) Int. Cl.
A47J 43/28 (2006.01)

(52) U.S. Cl.
CPC .................. A47J 43/285 (2013.01)

(58) Field of Classification Search
CPC ........ A47J 43/28; A47J 43/282; A47J 43/284; A47J 43/285
See application file for complete search history.

(56) References Cited

U.S. PATENT DOCUMENTS

| | | | | |
|---|---|---|---|---|
| 19,419 A * | 2/1858 | Haines | .................. | B30B 9/3064 100/234 |
| 2,522,343 A * | 9/1950 | Canfield | ................. | A47J 43/22 209/357 |
| 2,887,948 A * | 5/1959 | Irving | .................... | A47G 21/04 294/7 |
| 2,994,320 A * | 8/1961 | Poschadel | ............... | A47J 45/10 220/628 |
| 3,822,020 A * | 7/1974 | Hong | .................... | A47J 43/281 248/167 |
| 4,043,039 A * | 8/1977 | Goetze, Jr. | ............ | A47J 43/283 30/325 |
| 4,825,551 A * | 5/1989 | Sherblom | ............. | A47J 43/281 30/325 |
| D379,746 S * | 6/1997 | Savicki | ......................... | D7/692 |
| 5,988,048 A * | 11/1999 | Hunter | .................... | A47J 43/20 99/413 |
| D438,434 S * | 3/2001 | Albrecht | ........................ | D7/692 |
| 7,090,269 B2 * | 8/2006 | Kelsey | ................. | A47J 43/283 294/16 |
| 7,356,933 B2 * | 4/2008 | Wong | .................... | A47J 43/284 30/325 |

(Continued)

Primary Examiner — Adam J Eiseman
Assistant Examiner — Richard D Crosby, Jr.
(74) Attorney, Agent, or Firm — Aleksandr Smushkovich

(57) ABSTRACT

A ladle, for filtering a mixture containing debris, includes an outer bowl with outer holes and an upper edge, an inner bowl disposed within the outer bowl forming a gap therebetween and having ether inner holes or protrusions separated by grooves, disposed below the upper edge and above the outer holes. The inner bowl can be provided with pins fixed to the protrusions, while the outer bowl can be provided with L-shape notches each matching the corresponding pin. Alternatively, the inner bowl can be provided with pins fixed in an upper region thereof, and the outer bowl can be provided with L-shape notches each matching the corresponding pin. In any case, the L-shape notches serve as guides for the pins during assembling the ladle. The inner bowl and outer bowl are provided with an inner and outer outlet spout respectively, to ease pouring out the filtered mixture from the ladle.

4 Claims, 15 Drawing Sheets

(56) References Cited

U.S. PATENT DOCUMENTS

| | | | |
|---|---|---|---|
| 7,523,973 B2 * | 4/2009 | Lin | A01K 1/0114 294/1.3 |
| D607,287 S * | 1/2010 | Beasley | D7/674 |
| D649,415 S * | 11/2011 | Williams | D7/667 |
| 8,356,845 B2 * | 1/2013 | Bernard | A01K 1/0114 294/1.3 |
| 2005/0173935 A1 * | 8/2005 | Pain | A01K 1/0114 294/1.3 |

* cited by examiner

SKIMMER LADLE

CROSS-REFERENCES TO RELATED APPLICATIONS

This U.S. patent application is a continuation-in-part application of a U.S. patent non-provisional application Ser. No. 17/387,043, filed on Jul. 28, 2021, entitled "Skimmer Ladle", wherein the disclosure of the foregoing non-provisional application is incorporated herein in its entirety by reference.

FIELD OF THE INVENTION

The present invention relates to kitchen utensils, specifically to a cookware class for broth extracting ladles. It can also be adopted for other similar utilities, e.g. various filtering devices.

BACKGROUND OF THE INVENTION

Prior art describes several types of ladles. Particularly, U.S. Pat. No. 6,722,043, hereby entirely incorporated by reference, discloses "a kitchen fat-skimming ladle", which "comprises of a handle, a container bowl, a conduit that drains from an inlet located at the interior bottom of the container to an outlet located behind the handle at its proximal end. This utensil uses the effective bottom draining principle of a common gravy skimmer and returns liquid stock to the pot while leaving fat behind for disposal. This ladle avails the entire brim of the ladle bowl to be used for scooping out the soup stock mixture enabling very natural handling. The liquid stock can be drained back into the pot easily by tipping the ladle backwards leaving fat behind. The conduit merges with the retainer bowl and handle, and is completely hidden from view. This dual-purpose ladle has the same simple elegant look and easy functioning of a common soup ladle.

In the other words: the broth is drained through the ladle into the pot, whereas the fat remains in the container bowl. In order to operate the above described ladle, the person should position his/her hand at a certain angle to provide necessary draining of the broth through the conduit. Then the person has to dispose of the fat remaining in the bowl.

Another U.S. Pat. No. 5,560,109, incorporated by reference herein, describes "apparatus for separating a liquid from a floating component, comprising first and second liquid receiving vessels, said first liquid receiving vessel being received within said second liquid receiving vessel, said first liquid receiving vessel having a hole at a base region thereof through which liquid received in said first liquid receiving vessel in use may flow into said second liquid receiving vessel from which said liquid may then be poured . . . . Such liquid will be pure liquid and the unwanted component will remain in the first vessel. The apparatus is preferably in the form of a spoon, but could also be in the form of a cup, jug, glass or the like."

Thus, the purified soup is poured from the second vessel, and the unwanted component (mostly fat) remains in the first vessel. To provide more or less efficient operation, the invention proposes that "preferably the first liquid receiving vessel is mounted for rotation relative to the second liquid receiving vessel, whereby when the second vessel is tilted to pour liquid therefrom, the first vessel remains horizontal and liquid in the first vessel does not escape into the second vessel other than by means of the hole." Again, after the purified soup has been poured from the second vessel, the first vessel has to be cleaned from the remaining unwanted component.

OBJECT AND SUMMARY OF THE INVENTION

The present invention allows to separate a mixture (e.g. soup in a pot) containing undesirable components (e.g., fat particles, floating debris, etc.) to get a substantially filtered mixture. On the other hand, it provides a novel functionality eliminating the need to dispose of the undesirable components after each scoop of the mixture made by the user. Therefore, the inventive ladle is so structured that it permits separating the filtered mixture (e.g., broth) from the undesirable components, which components substantially remain in the mixture (e.g., in the pot containing soup).

A first embodiment of the inventive ladle comprises: an outer bowl with a number (preferably a plurality) of outer holes of predetermined sizes and shapes provided preferably in the bottom region thereof (bottom holes), and/or in the middle region thereof (sidewall holes); a handle for holding the outer bowl by the user attached to the outer bowl; an inner bowl disposed within the outer bowl so that a predetermined gap is provided therebetween. In its upper region, the inner bowl is provided with a number (preferably a plurality) of inner holes. In the region of its upper edge, the inner bowl is supplied with a number of holders (preferably spring-loaded brackets or latches, preferably having a U-loop shape) disposed in such a way that joining (embracing) the upper region of the outer bowl and the upper region of the inner bowl thereby allowing the outer bowl to support the inner bowl therein during operation. Optionally, the outer bowl can be made of mesh with predeterminedly small cells to filter out small debris of the mixture.

According to the first embodiment, the inner holes are disposed predeterminedly below the upper edge of the outer bowl and predeterminedly above the outer holes of the outer bowl. This provides for better filtering of the undesirable components from the mixture (e.g. soup in a pot).

The inner bowl is preferably removably attached to the outer bowl, using the aforementioned loop-shape holders, which facilitates the cleaning of the inner and the outer bowls. In other design options of the first embodiment, the inner bowl may be fixedly attached to the outer bowl, for example, by a number of rivets or screws disposed in the upper regions of the bowls. The inner bowl can be provided with an inner outlet spout to ease the pouring out of the filtered mixture therefrom. For the same reason, the outer bowl can be provided with an outer outlet spout preferably positioned coaxially with the inner outlet spout. The axis of the outlet spouts can be positioned diametrically opposite to the axis of the handle or at any convenient angle thereto (e.g. 90 degrees, as shown in FIG. 3a), at a designer's choice.

A second embodiment of the inventive ladle comprises: an outer bowl with a number (preferably a plurality) of holes of predetermined sizes and shapes provided preferably in the bottom region thereof (bottom holes), and/or in the middle region thereof (sidewall holes); a handle attached to the outer bowl for holding the outer bowl by the user; an inner bowl disposed within the outer bowl so that a predetermined gap is provided therebetween.

In its upper region, the inner bowl has a plurality of protrusions respectfully separated by a plurality of grooves. At least some of the protrusions are supplied with holders (preferably spring-loaded brackets or latches, preferably having a shape of U-loop) joining (embracing) an upper region of the outer bowl and an upper region of the inner bowl, thereby allowing the outer bowl to support the inner bowl therein during operation. The inner bowl is preferably made removably attached to the outer bowl, using the aforementioned holders, which facilitates the cleaning of the inner and outer bowls.

According to the second embodiment, the lower edges of the grooves of the inner bowl are disposed predeterminedly below the upper edge of the outer bowl and predeterminedly above the holes of the outer bowl. This provides for better filtering of the undesirable components from the mixture (e.g. soup in a pot).

In other design options of the second embodiment, the inner bowl may be fixedly attached to the outer bowl, for example by a number of rivets or screws joining the outer bowl with the inner bowl in the upper regions of the bowls. The inner bowl can be provided with an inner outlet spout that may preferably be conjugated with one of the grooves to ease the pouring out of the filtered mixture from the inner bowl. For the same reason, the outer bowl can be provided with an outer outlet spout preferably positioned coaxially with the inner outlet spout. The axis of the outlet spouts can be positioned diametrically opposite to the axis of the handle or at any convenient angle (e.g. 90 degrees as shown in FIG. 3a) thereto, at a designer's choice. Optionally, the outer bowl can be made of mesh with predeterminedly small cells to filter out small debris of the mixture.

A third embodiment of the inventive ladle comprises: an outer bowl with a number (preferably a plurality) of holes of predetermined sizes and shapes provided preferably in the bottom region thereof (bottom holes), and/or in the middle region thereof (sidewall holes); at least one handle attached to the outer bowl for holding the outer bowl by the user; an inner bowl is disposed within the outer bowl so that a predetermined gap is provided therebetween.

The inner bowl is removably attached to the outer bowl, using special attachment means described below, which facilitate the cleaning of the inner and outer bowls. Additionally to the second embodiment, the third embodiment also provides for an easier way for assembling and dissembling the inventive ladle that increases its consumer quality and makes it user friendly (comparatively to the second embodiment), and thus more attractive for prospective users. Therefore the third embodiment should be considered more effective.

According to the third embodiment, the inner bowl has a plurality of protrusions respectfully separated by a plurality of grooves circumferentially arranged in the upper region of the inner bowl. At least some of protrusions each is provided with a pin (projection) attached (for instance, welded) thereto. An upper region of the outer bowl is provided with a number of L-shape notches equal to the number of the pins of the inner bowl, wherein each L-shape notch serves as a guide for the respective pin. The L-shape notch each consists of a vertical portion and a horizontal portion extending at the right angle to the vertical portion.

The L-shape notches are arranged in such a way that, when the operator inserts the inner bowl into the outer bowl, each of the pins is inserted in the vertical portion of the corresponding L-shape notch; the pins then slide down until meet bottoms of the vertical portions being beginnings of the horizontal portions of the corresponding L-shape notches. Thereafter, operator turns the inner bowl in relation to the outer bowl until the pins sliding within the horizontal portions of the corresponding L-shape notches reach ends of the horizontal portions. In this position, the outer bowl fixes and supports the inner bowl therein during operation. When the operator finishes using the ladle, she/he turns the inner bowl in the opposite direction until the pins reach the beginnings of the horizontal portions being the bottoms of the vertical portions, and then pulls the inner bowl up until the pins are extracted from the L-shape notches and thereby the inner bowl is separated from the outer bowl.

According to the third embodiment, the lower edges of the grooves of the inner bowl are disposed predeterminedly below the upper edge of the outer bowl and predeterminedly above the holes of the outer bowl. This provides for better filtering of the undesirable components from the mixture (e.g. soup in a pot). The inner bowl can be provided with an inner outlet spout (similar to the first and second embodiments) to ease the pouring out of the filtered mixture therefrom. For the same reason, the outer bowl can be provided with an outer outlet spout preferably positioned coaxially with the inner outlet spout. The axis of the outlet spouts can be positioned diametrically opposite to the axis of the handle or at any convenient angle thereto (e.g. 90 degrees, as shown in FIG. 3a), at a designer's choice.

A fourth embodiment of the inventive ladle comprises: an outer bowl with a number (preferably a plurality) of outer holes of predetermined sizes and shapes provided preferably in the bottom region thereof (bottom holes), and/or in the middle region thereof (sidewall holes); a handle for holding the outer bowl by the user attached to the outer bowl; an inner bowl disposed within the outer bowl so that a predetermined gap is provided therebetween. In its upper region, the inner bowl is provided with a number (preferably a plurality) of inner holes.

The inner bowl is removably attached to the outer bowl, using special attachment means described below, which facilitate the cleaning of the inner and outer bowls. Additionally to the first embodiment, the fourth embodiment also provides for an easier way for assembling and dissembling the inventive ladle that increases its consumer quality and makes it user friendly (comparatively to the first embodiment), and thus more attractive for prospective users. Therefore the fourth embodiment should be considered more effective.

According to the fourth embodiment, the inner holes are disposed predeterminedly below the upper edge of the outer bowl and predeterminedly above the outer holes of the outer bowl. This provides for better filtering of the undesirable components from the mixture (e.g. soup in a pot). The inner bowl can be provided with an inner outlet spout (similar to the first and second embodiments) to ease the pouring out of the filtered mixture therefrom. For the same reason, the outer bowl can be provided with an outer outlet spout preferably positioned coaxially with the inner outlet spout. The axis of the outlet spouts can be positioned diametrically opposite to the axis of the handle or at any convenient angle thereto (e.g. 90 degrees, as shown in FIG. 3a), at a designer's choice.

DESIGN OF PREFERRED EMBODIMENTS OF THE PRESENT INVENTION

Figure 1A:
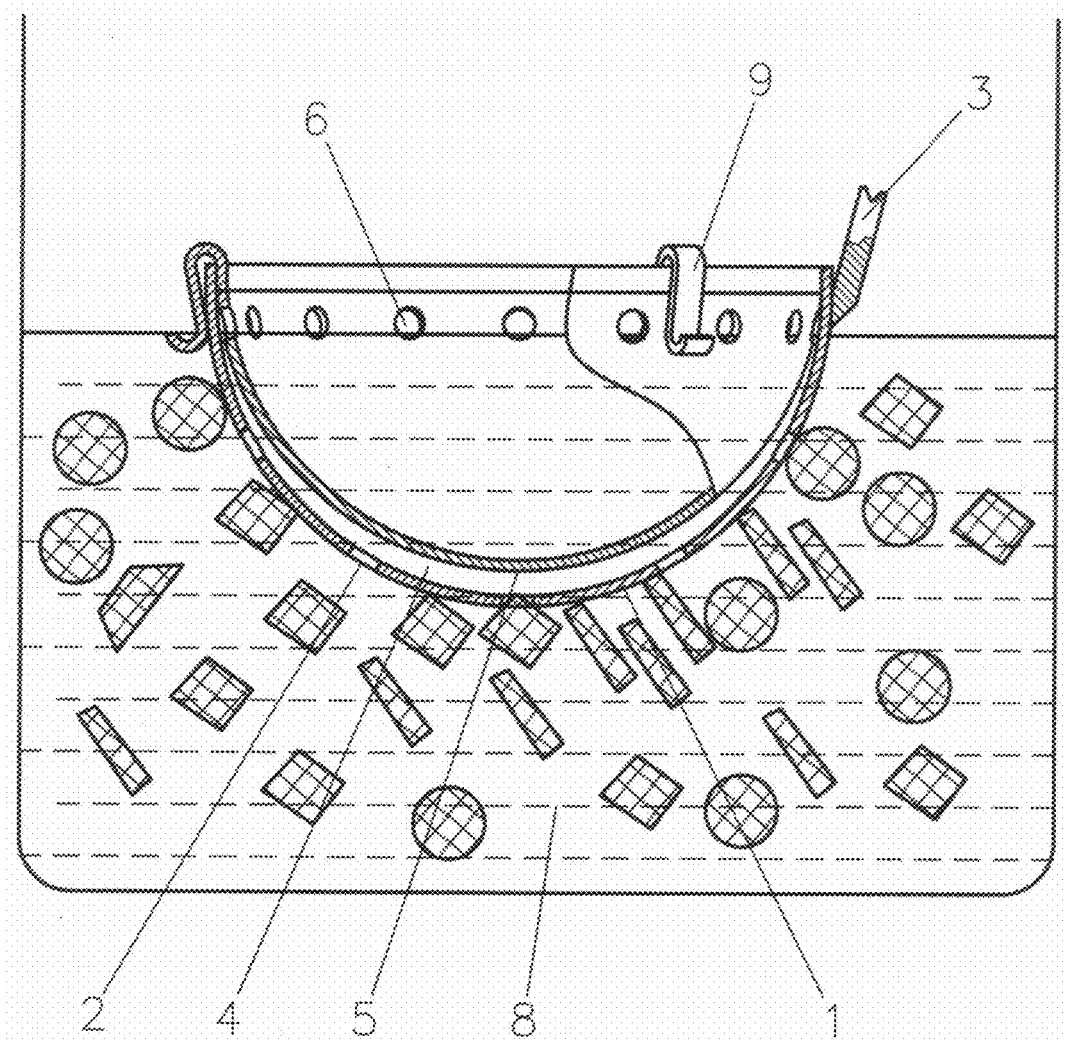
FIG. 1a illustrates a sectional view of a first embodiment of the inventive ladle submerged into a mixture.
Figure 1B:
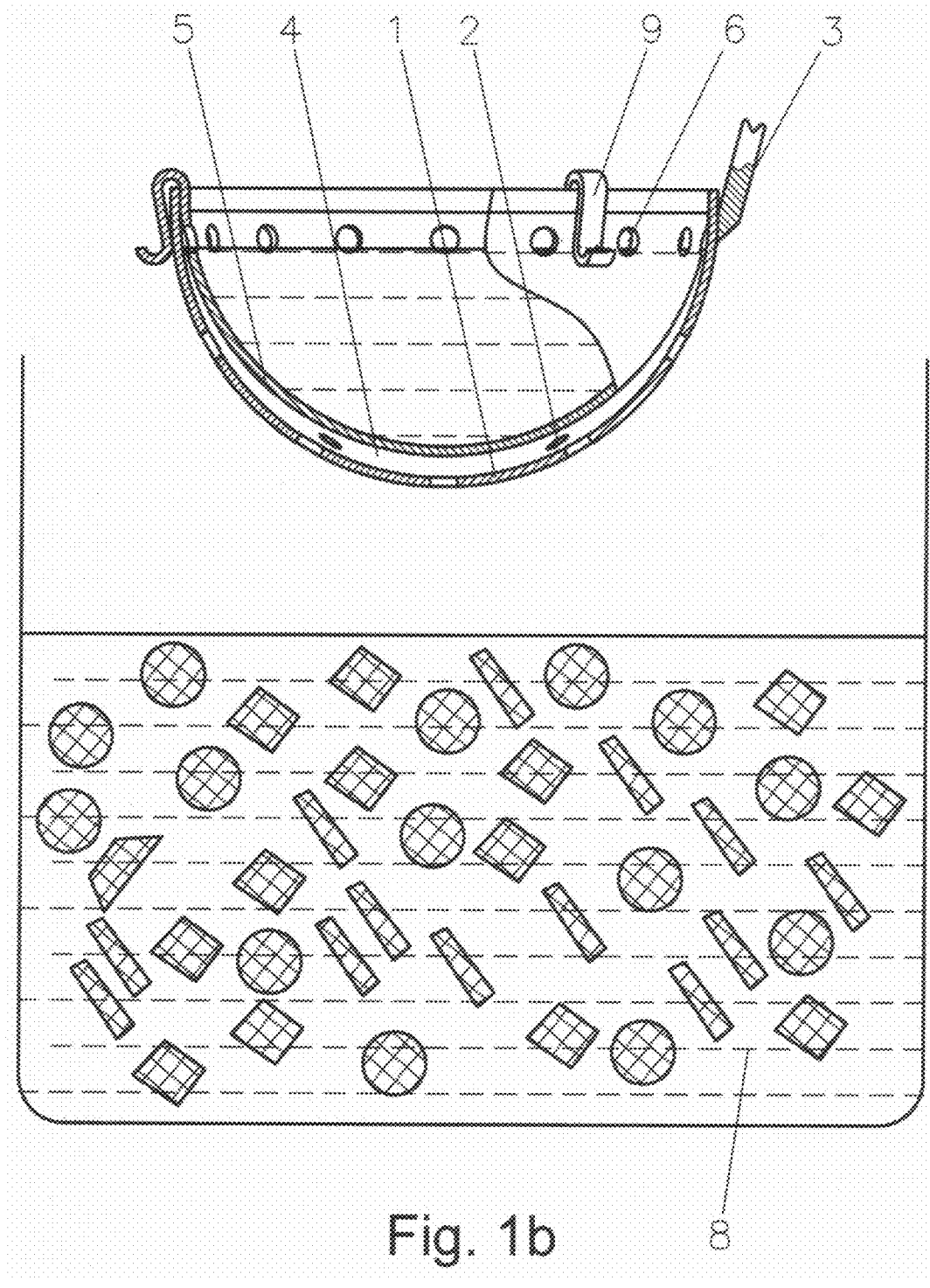
FIG. 1B illustrates a sectional view of the embodiment shown in FIG. 1a, wherein the ladle is pulled out of the mixture.
Figure 2:
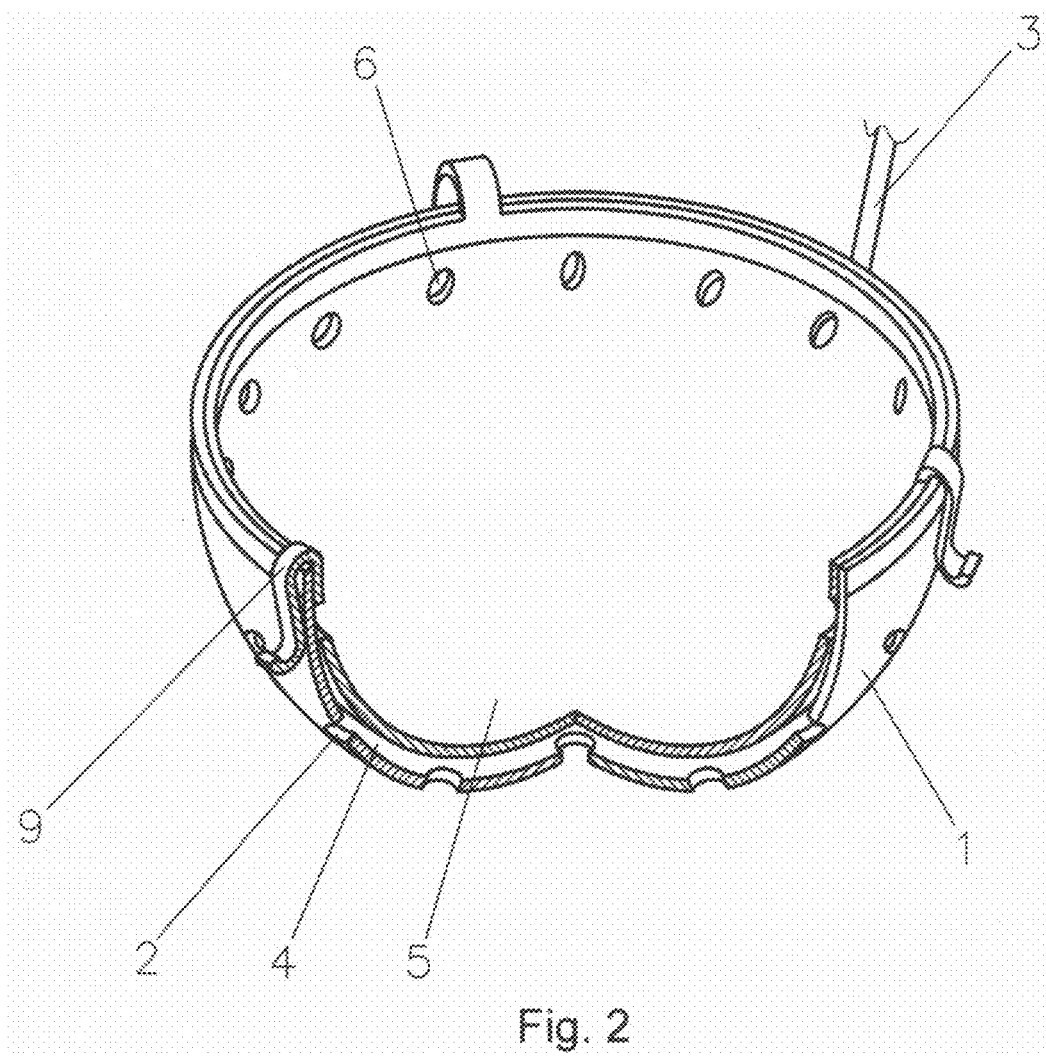
FIG. 2 illustrates an exploded (isometric) view of the first embodiment shown on FIGS. 1a and 1b.

While the invention may be susceptible to embodiment in different forms, there is shown in the drawings, and will be described in detail herein, specific embodiments of the present invention, with the understanding that the present disclosure is to be considered an exemplification of the principles of the invention, and is not intended to limit the invention to that as illustrated and described herein.

The first preferred embodiment of the present invention is illustrated on FIGS. 1a, 1b, 2, and 4. According to the first embodiment, the inventive ladle comprises: an outer bowl 1 with a number of outer holes 2 provided in the bottom region thereof (bottom holes 2b shown in FIG. 4), and/or in the middle region thereof (sidewall holes 2s shown in FIG. 4); a handle 3 for holding the outer bowl 1 by the user and submerging the outer bowl 1 into a mixture 8; the handle 3 is attached to the outer bowl 1; an inner bowl 5 disposed within the outer bowl 1 so that a predetermined gap 4 is provided therebetween. In its upper region, the inner bowl 5 is provided with a plurality of inner holes 6 disposed predeterminedly below the upper edge of the outer bowl 1 and predeterminedly above the outer holes 2.

The ladle is supplied with a number of holders 9 (preferably having a shape of U-loop) disposed in such a way that joining the upper region of the outer bowl 1 and the upper region of the inner bowl 5, thereby allowing the outer bowl 1 to support the inner bowl 5 therein during operation. The inner bowl 5 is provided with an inner outlet spout 10b and the outer bowl 1 is provided with an outer outlet spout 10a disposed coaxially with the inner outlet spout 10b (as shown in FIG. 3a), to ease the pouring out of the filtered mixture from the ladle.

The inventive ladle can have a circular shape, an oval shape, or another convenient shape at a designer's choice. The size and shape of the holes 2 (2b, 2s) may be chosen considering most efficient filtering of any undesirable components, so that the undesirable components remain outside of the outer bowl 1 when it's submerged into the mixture 8. In certain design options, an additional cover (not shown) may be placed over an external surface of the outer bowl, which cover may be made of suitable filtering materials. It is possible to use a number of interchangeable outer bowls 1 with different shapes and sizes of the holes 2 in combination with, for example, one inner bowl 5, and vice-versa.

Figure 3:
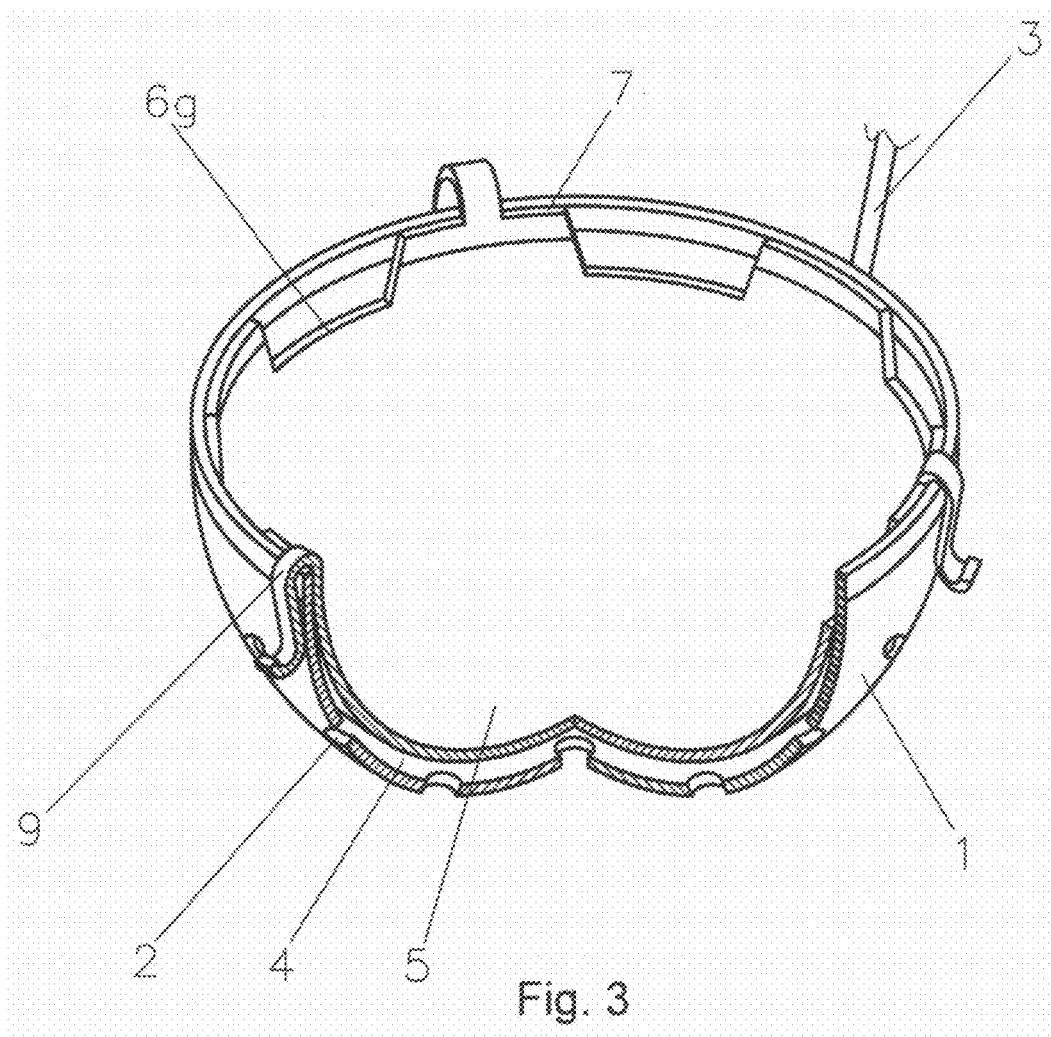
FIG. 3 illustrates an exploded (isometric) view of a second embodiment of the inventive ladle.
Figure 3A:
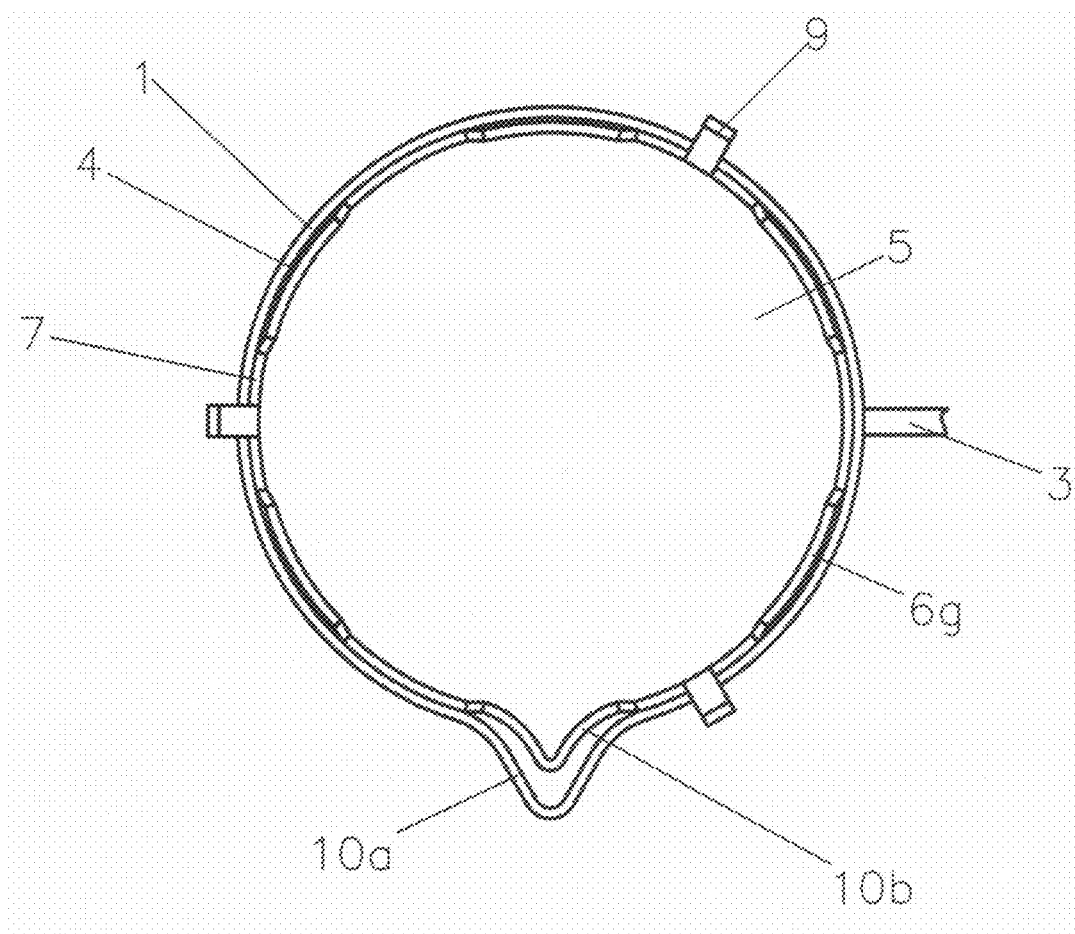
FIG. 3a illustrates a plan projection view of the second embodiment of the inventive ladle.
Figure 3B:
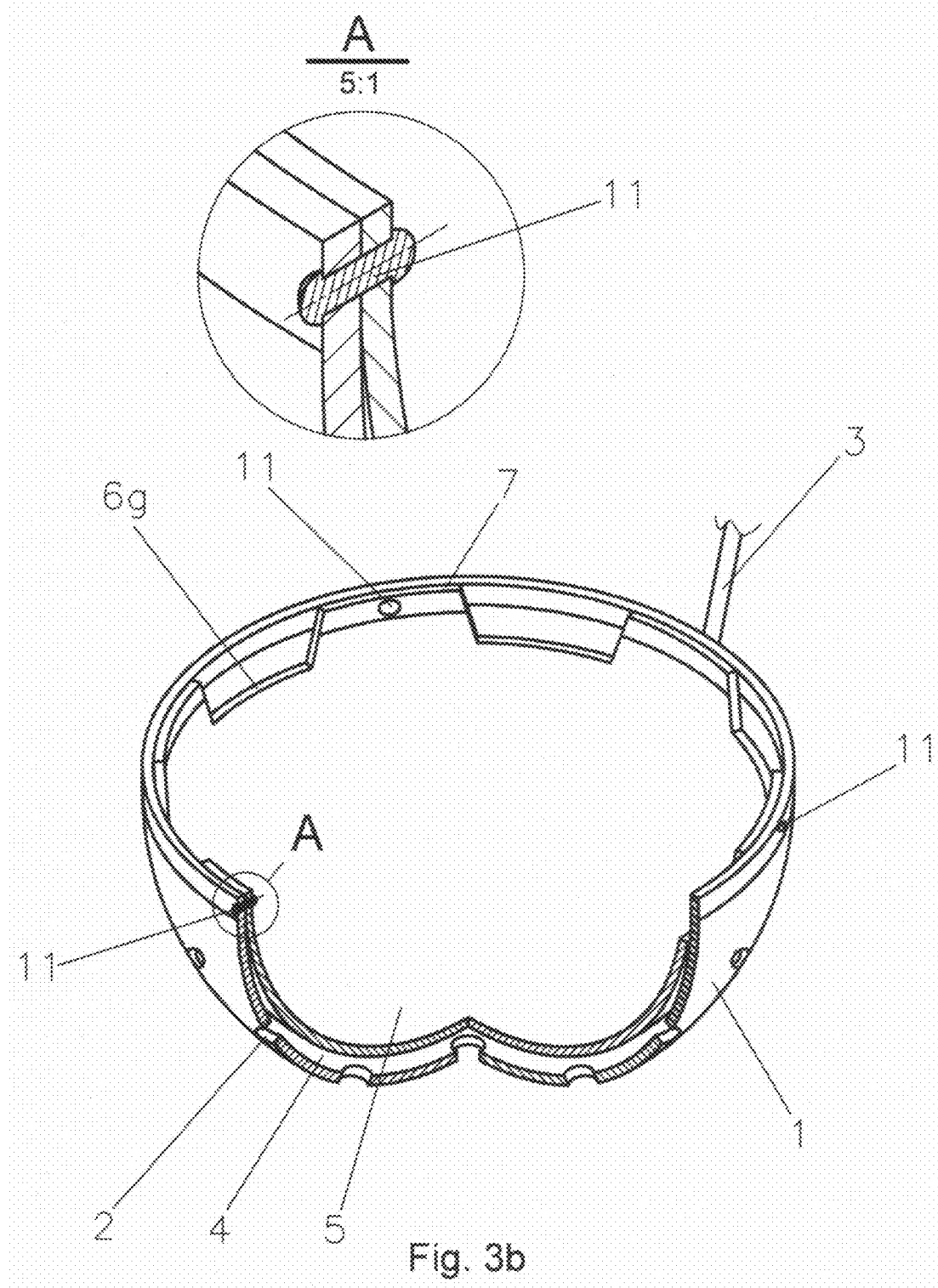
FIG. 3b illustrates an exploded (isometric) view of another design option of the second embodiment of the inventive ladle.
Figure 4:
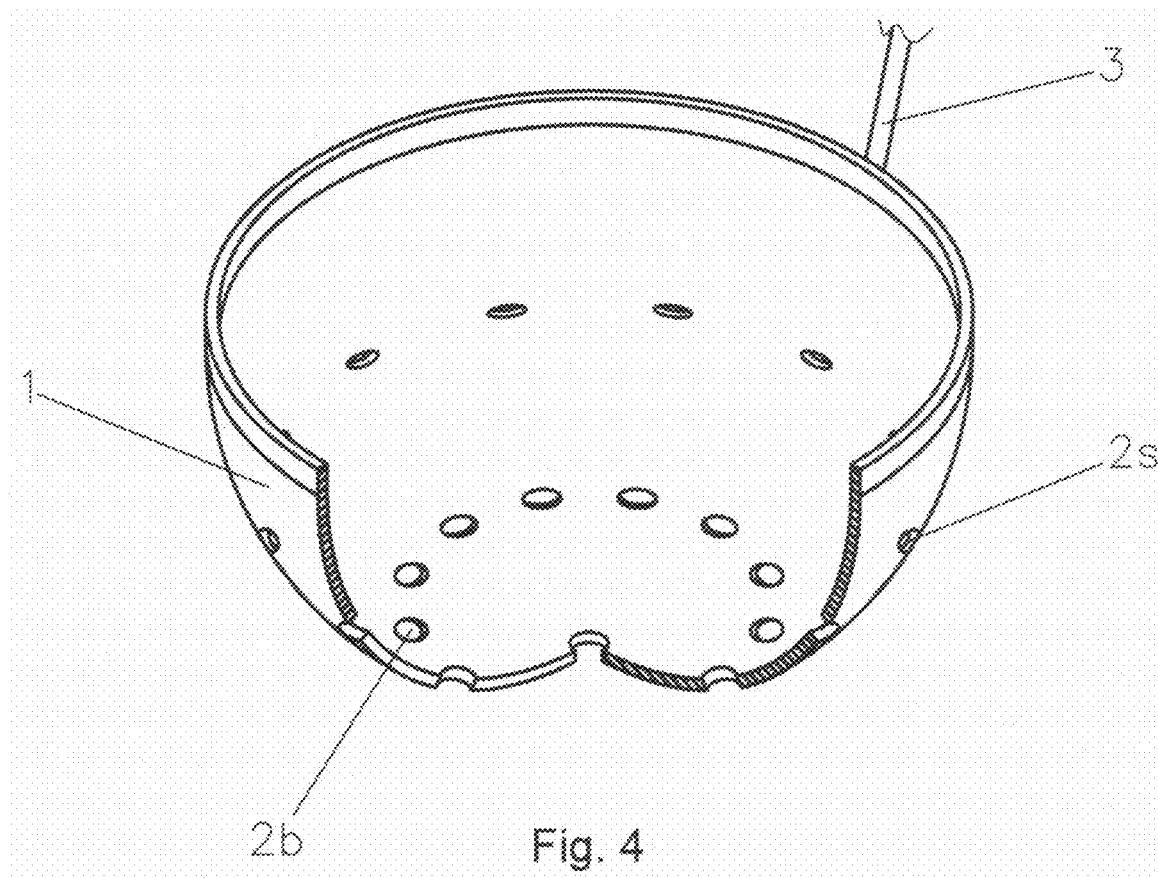
FIG. 4 illustrates an exploded (isometric) view of another design option of the first embodiment of the inventive ladle.

The second preferred embodiment of the present invention is illustrated on FIGS. 3, 3a and 3b. According to the second embodiment, the inventive ladle comprises: an outer bowl 1 with a number of holes 2 provided in the bottom region thereof (bottom holes 2b shown in FIG. 4), and/or in the middle region thereof (sidewall holes 2s shown in FIG. 4); a handle 3 attached to the outer bowl 1 for holding the outer bowl by the user; an inner bowl 5 disposed within the outer bowl 1 so that a predetermined gap 4 is provided therebetween. In its upper region, the inner bowl 5 has a plurality of protrusions 7 respectively separated by a plurality of grooves 6g. At least some of the protrusions 7 each is supplied with a holder 9 preferably having a U-loop shape, and joining the outer bowl 1 with the inner bowl 5 in the upper regions thereof, thereby allowing the outer bowl 1 to support the inner bowl 5 therein during operation.

The lower edges of the grooves 6g are disposed predeterminedly below the upper edge of the outer bowl 1, but predeterminedly above the holes 2 of the outer bowl 1. The inner bowl 5 is provided with an inner outlet spout 10b (shown in FIG. 3a) conjugated with one of the grooves 6g, and the outer bowl 1 is provided with an outer outlet spout 10a (shown in FIG. 3a), coaxially disposed with the inner outlet spout 10b, to ease the pouring out the filtered mixture from the inner bowl 5.

In other design options of the second embodiment, the inner bowl 5 may be fixedly attached to the outer bowl, for example by a number of rivets 11 or screws joining the outer bowl 1 with the inner bowl 5 in the upper regions of the inner and upper bowls.

According to the third embodiment (illustrated on FIGS. 5, 5a, 5b and 5c), the inventive ladle comprises: an outer bowl 1 with a number (preferably a plurality) of holes 2 of predetermined sizes and shapes provided preferably in the bottom region thereof (bottom holes), and/or in the middle region thereof (sidewall holes); at least one handle attached (similar to the handle 3 of the second embodiment, FIG. 1a) to the outer bowl for holding the outer bowl by the user; an inner bowl 5 is disposed within the outer bowl 2 so that a predetermined gap 4 is provided therebetween.

The inner bowl 5 is removably attached to the outer bowl 1, using special attachment means described below, which facilitate the cleaning of the inner and outer bowls. Additionally to the second embodiment, the third embodiment also provides for an easier way for assembling and dissembling the inventive ladle that increases its consumer quality and makes it user friendly (comparatively to the second embodiment), and thus more attractive for prospective users. Therefore the third embodiment should be considered more effective.

Figure 5:
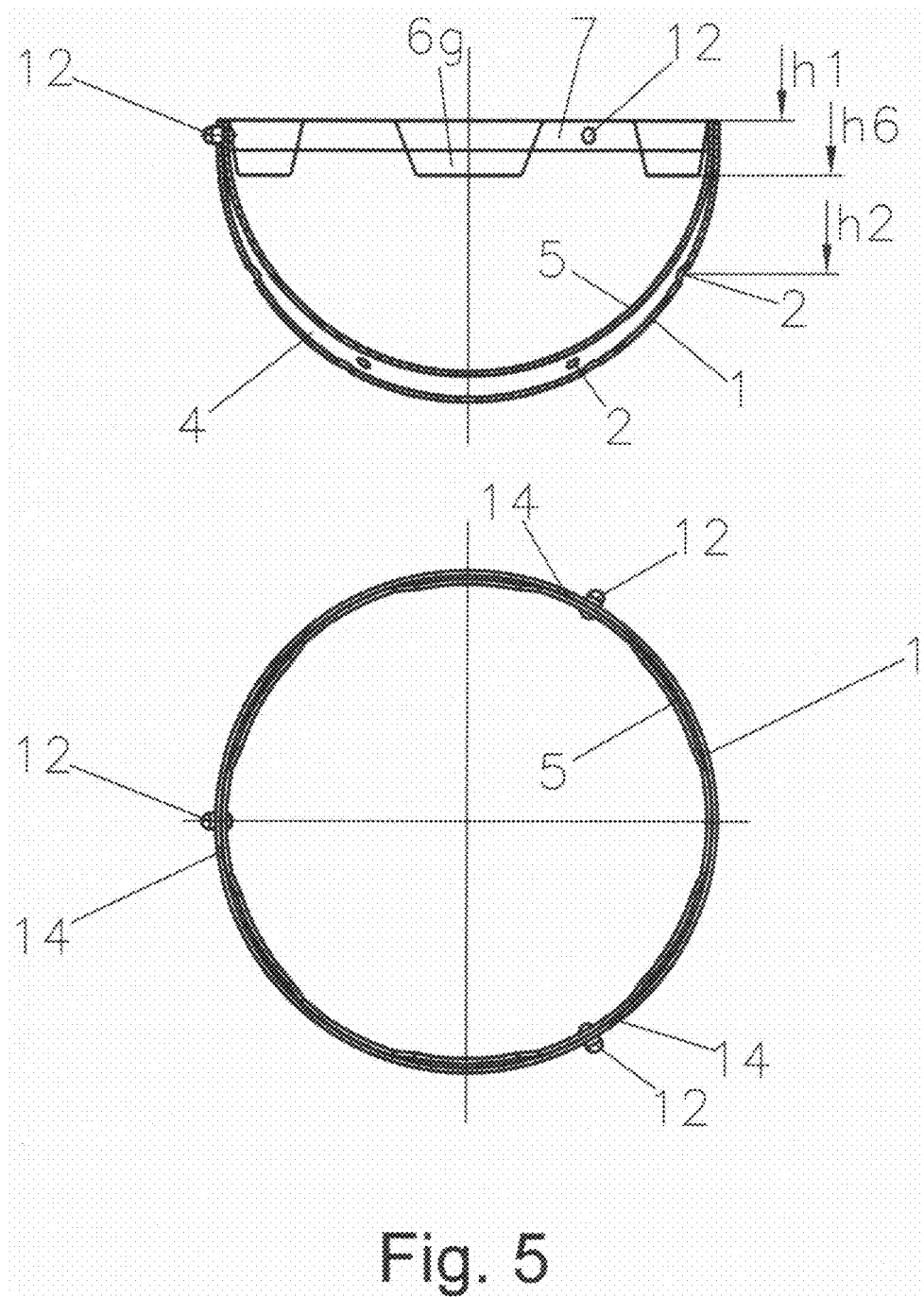
FIG. 5 illustrates a lateral sectional view and a plan view of a third embodiment of the inventive ladle.
Figure 5A:
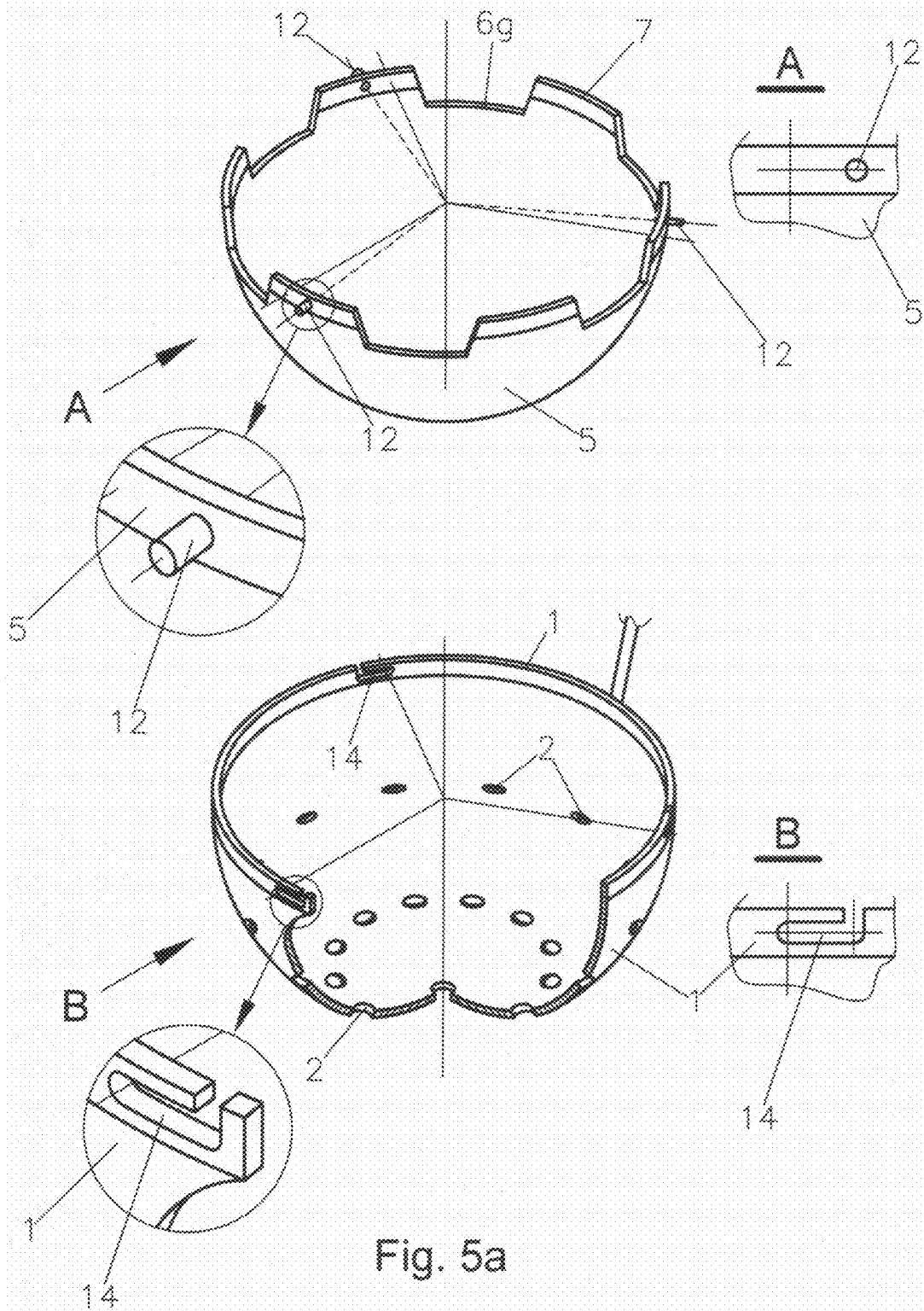
FIG. 5a illustrates an exploded (isometric) view of the inner bowl and the outer bowl of the third embodiment of the inventive ladle.
Figure 5B:
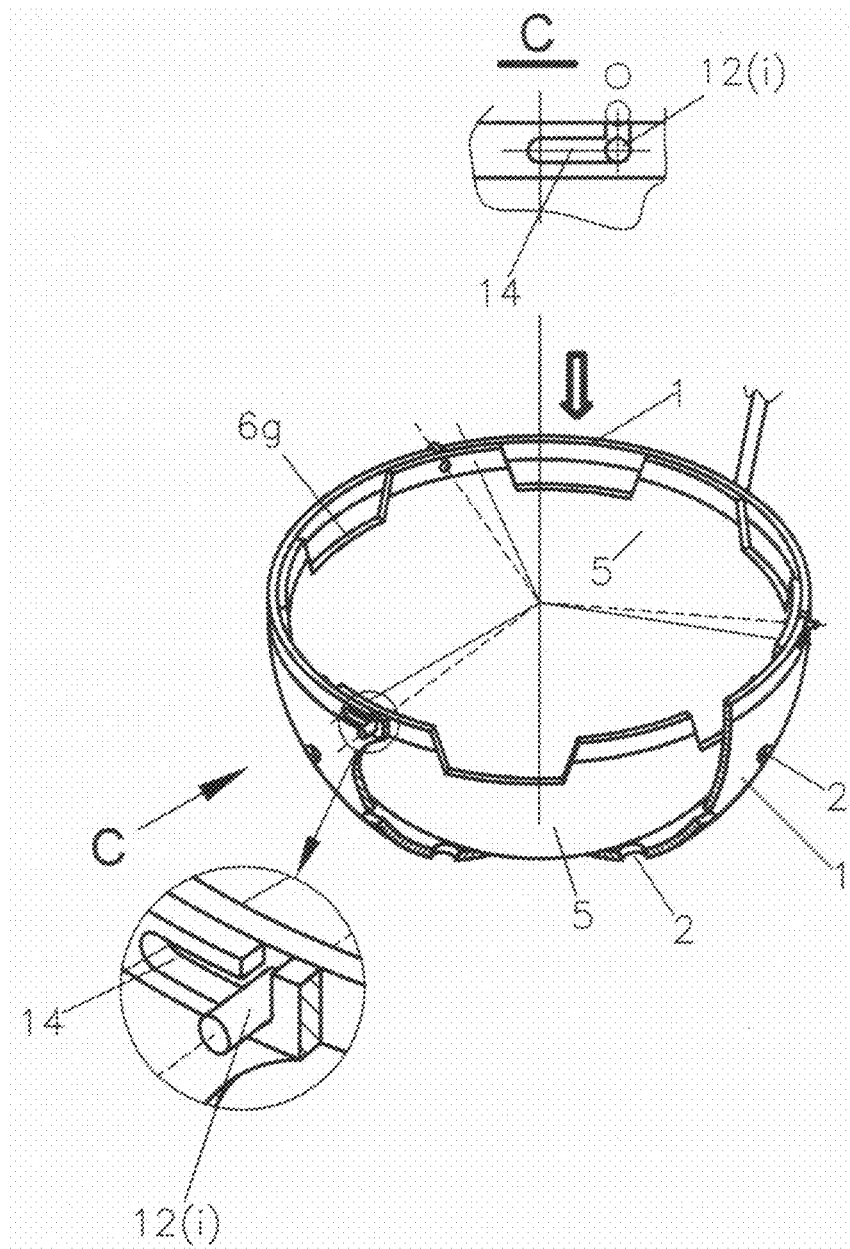
FIG. 5b illustrates an exploded (isometric) view of the inner bowl of the third embodiment of the inventive ladle for a first position during assembling of the ladle.

According to the third embodiment, the inner bowl 5 has a plurality of protrusions 7 respectfully separated by a plurality of grooves 6g circumferentially arranged in the upper region of the inner bowl 5. At least some of protrusions each is provided with a pin (projection) 12 fixedly attached (for instance, welded) to the inner bowl 5 (FIG. 5a, view A). An upper region of the outer bowl 1 is provided with a number of L-shape notches 14 equal to the number of the pins 12 of the inner bowl 5, wherein each L-shape notch 14 is positioned correspondingly and serves as a guide for the respective pin 12. The L-shape notch 14 each consists of a vertical portion and a horizontal portion extending at the right angle to the vertical portion (FIG. 5a, view B).

Figure 5C:
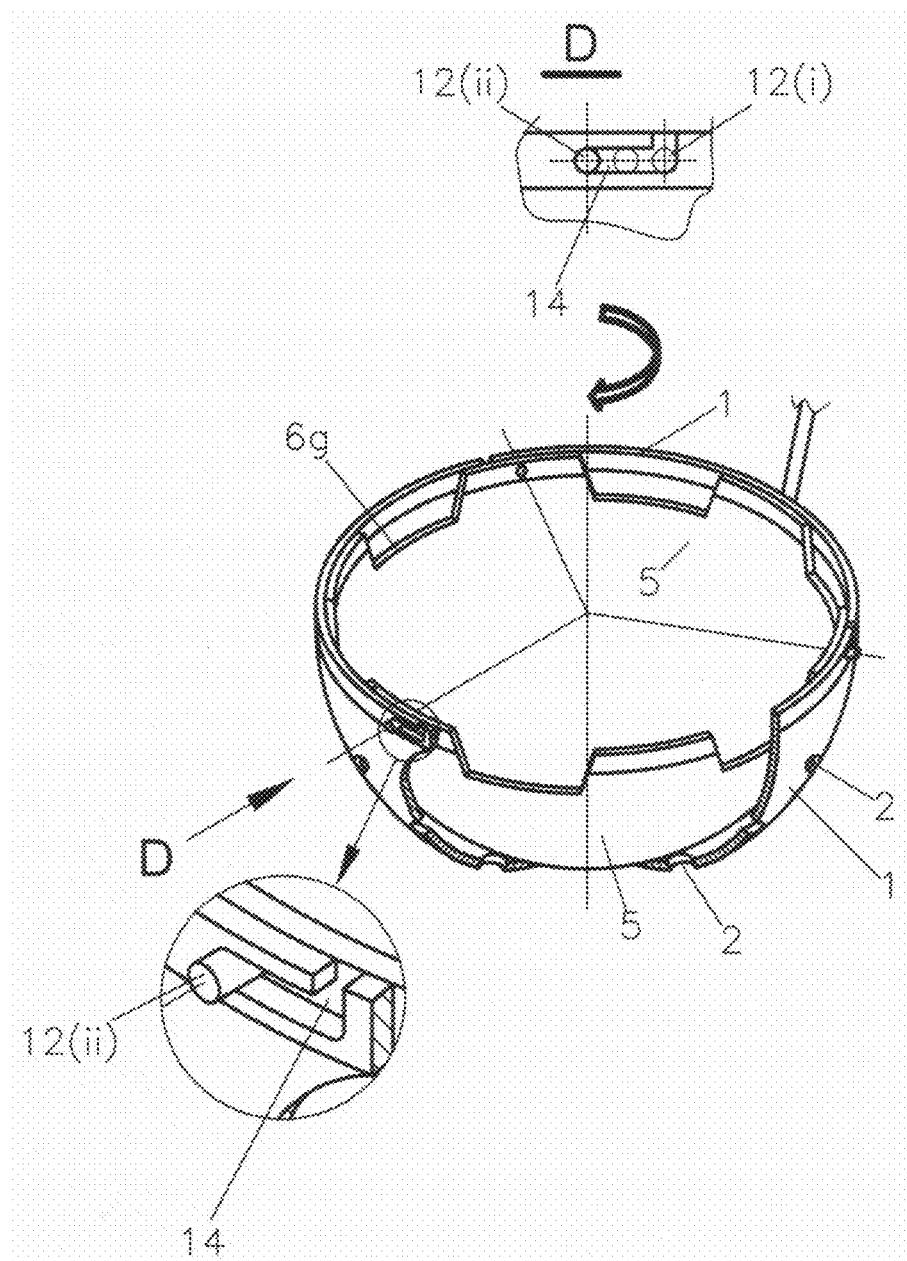
FIG. 5c illustrates an exploded (isometric) view of the inner bowl of the third embodiment of the inventive ladle for a second position during assembling of the ladle.

The L-shape notches 14 are arranged in such a way that, when the operator inserts the inner bowl 5 into the outer bowl 1, each of the pins 12 is inserted in the vertical portion of the corresponding L-shape notch 14 (FIG. 5b, view C); the pins 12 then slide down (position 12(i) of the pin) until meet bottoms of the vertical portions being beginnings of the horizontal portions of the corresponding L-shape notches 14 (FIG. 5c, view D). Thereafter, operator turns the inner bowl 5 in relation to the outer bowl 1 until the pins 12 sliding within the horizontal portions of the corresponding L-shape notches 14 reach ends of the horizontal portions (position 12(ii) of the pin). In the position 12ii, the outer bowl 1 fixes and supports the inner bowl 5 therein during operation. When the operator finishes using the ladle, she/he turns the inner bowl 5 in the opposite direction until the pins 12 reach the beginnings of the horizontal portions being the bottoms of the vertical portions (position 12(i) of the pin), and then pulls the inner bowl 5 up until the pins 12 are extracted from the L-shape notches 14 and thereby the inner bowl 5 is separated from the outer bowl 1.

According to the third embodiment, the lower edges of the grooves 6g of the inner bowl 5 are disposed predeterminedly below (at a level h6 shown in FIG. 5) the upper edge (at a level h1 shown in FIG. 5) of the outer bowl 1 and predeterminedly above (at a level h2 shown in FIG. 5) the holes 2 of the outer bowl 1. This provides for better filtering of the undesirable components from the mixture (e.g. soup in a pot).

According to the fourth embodiment (illustrated on FIGS. 6, 6a, 6b and 6c), the inventive ladle comprises: an outer bowl 1 with a number (preferably a plurality) of outer holes 2 of predetermined sizes and shapes provided preferably in the bottom region thereof (bottom holes), and/or in the middle region thereof (sidewall holes); a handle (similar to the handle 3 of the second embodiment, FIG. 1a) for holding the outer bowl 1 by the user attached to the outer bowl 1; an inner bowl 5 disposed within the outer bowl 1 so that a predetermined gap (similar to the gap 4 of the first embodiment, FIG. 1a) is provided therebetween. In its upper region, the inner bowl 5 is provided with a number (preferably a plurality) of inner holes 6.

The inner bowl 5 is removably attached to the outer bowl 1, using special attachment means described below, which facilitate the cleaning of the inner and outer bowls. Additionally to the first embodiment, the fourth embodiment also provides for an easier way for assembling and dissembling the inventive ladle that increases its consumer quality, makes it user friendly (comparatively to the first embodiment), and thus more attractive for prospective users. Therefore the fourth embodiment should be considered more effective.

Figure 6:
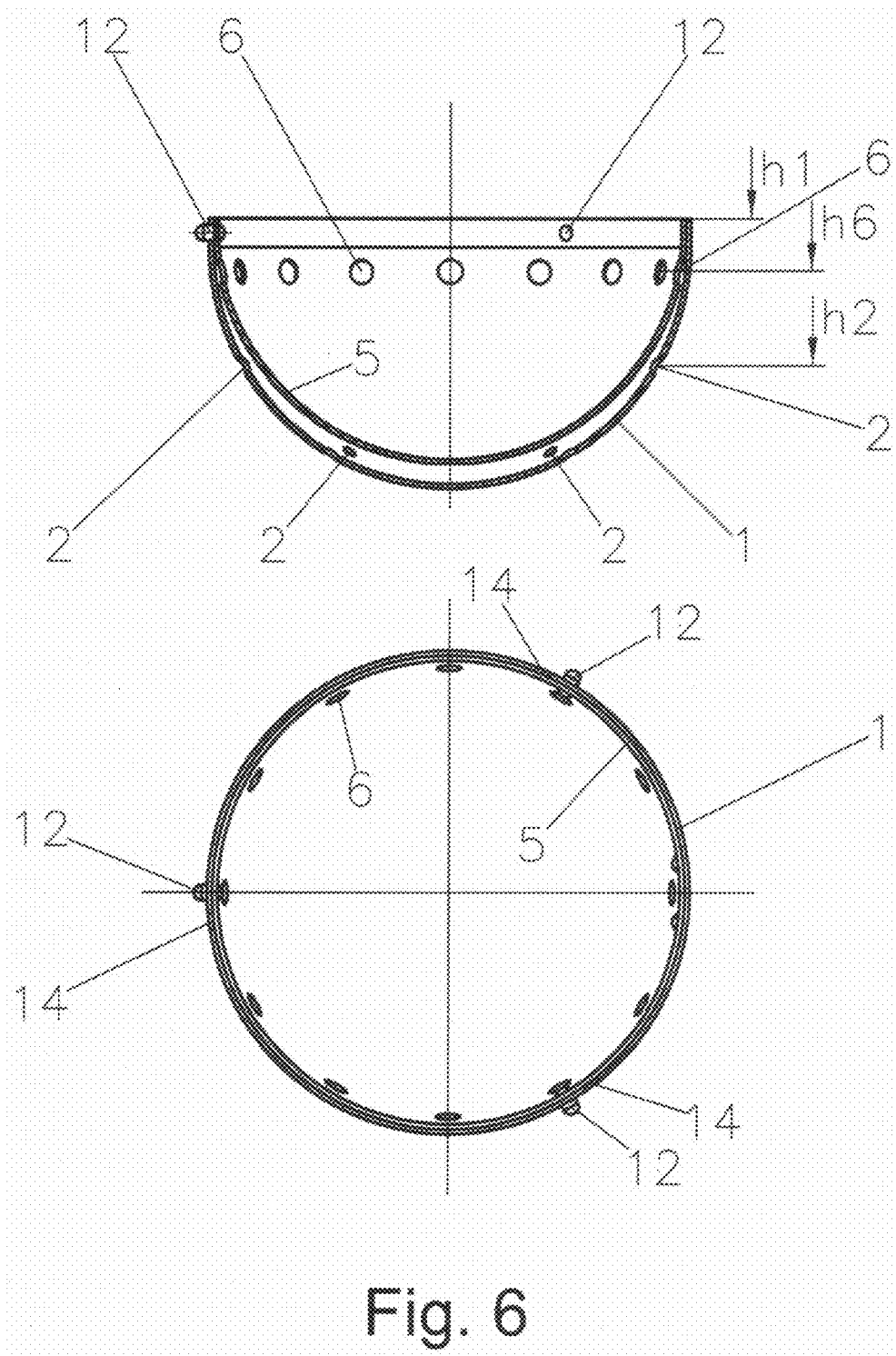
FIG. 6 illustrates a lateral sectional view and a plan view of a fourth embodiment of the inventive ladle.
Figure 6A:
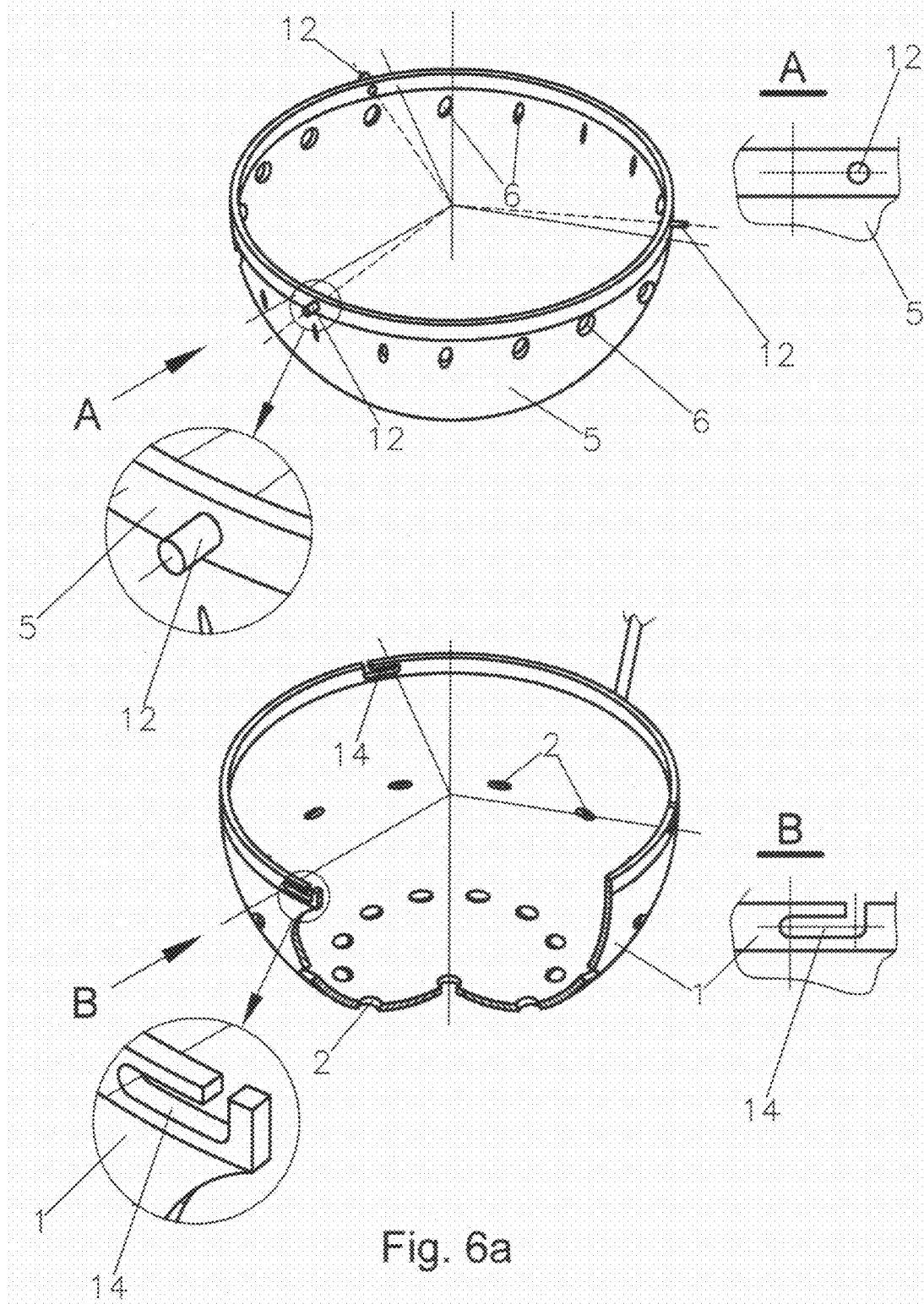
FIG. 6a illustrates an exploded (isometric) view of the inner bowl and the outer bowl of the fourth embodiment of the inventive ladle.
Figure 6B:
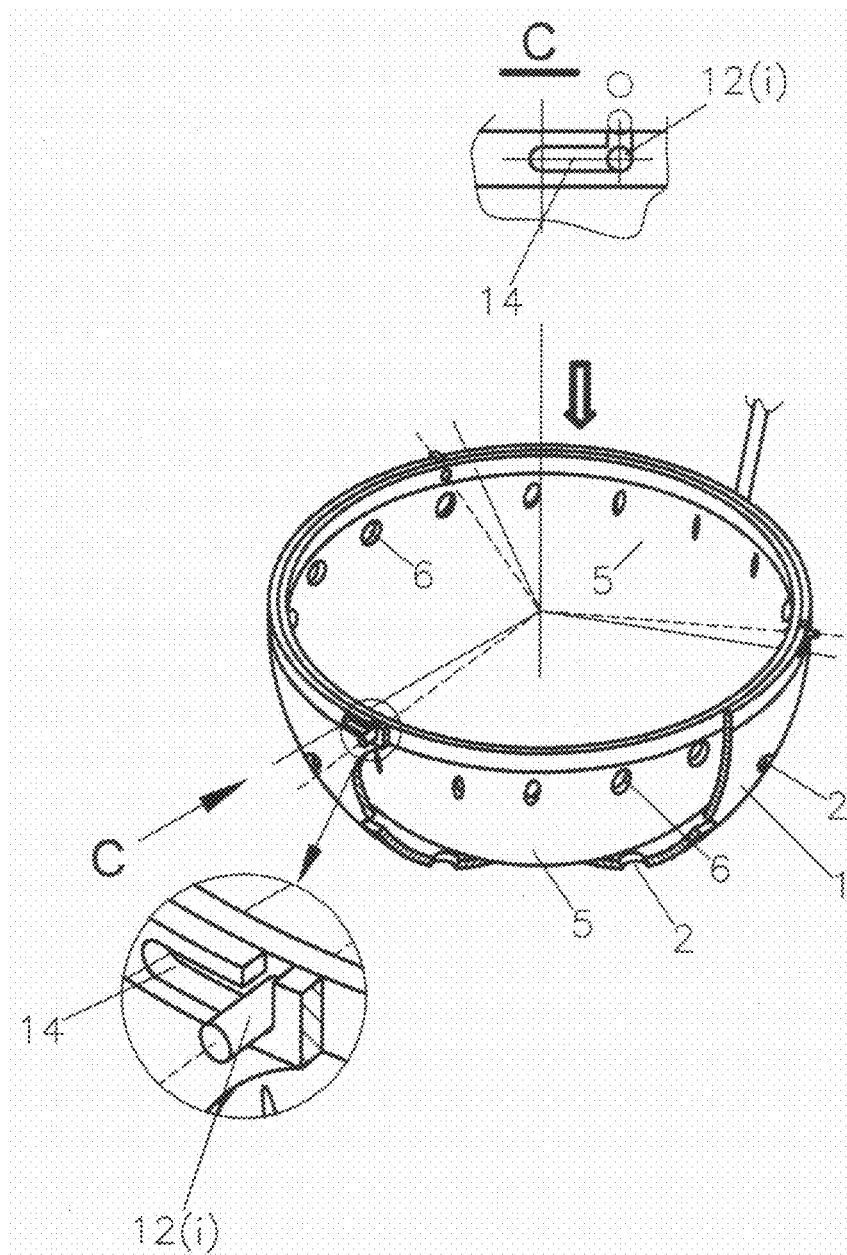
FIG. 6b illustrates an exploded (isometric) view of the inner bowl of the fourth embodiment of the inventive ladle for a first position during assembling of the ladle.

According to the fourth embodiment, the inner bowl 5 is provided with a number of pins (projections) 12 fixedly attached (for instance, welded) to the inner bowl 5 (FIG. 6a, view A). An upper region of the outer bowl 1 is provided with a number of L-shape notches 14 equal to the number of the pins 12 of the inner bowl 5, wherein each L-shape notch 14 is positioned correspondingly and serves as a guide for the respective pin 12. The L-shape notch 14 each consists of a vertical portion and a horizontal portion extending at the right angle to the vertical portion (FIG. 6a, view B).

Figure 6C:
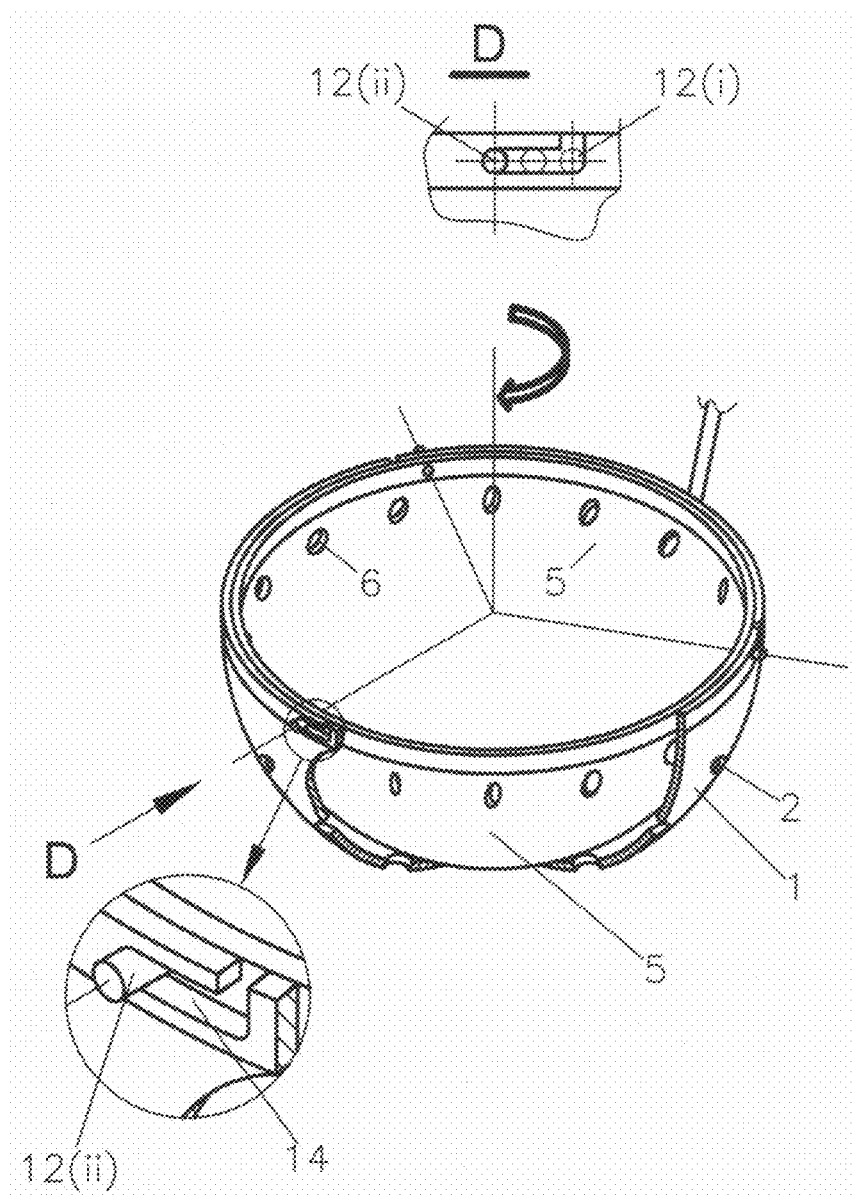
FIG. 6c illustrates an exploded (isometric) view of the inner bowl of the fourth embodiment of the inventive ladle for a second position during assembling of the ladle.

The L-shape notches 14 are arranged in such a way that, when the operator inserts the inner bowl 5 into the outer bowl 1, each of the pins 12 is inserted in the vertical portion of the corresponding L-shape notch 14 (FIG. 6b, view C); the pins 12 then slide down (position 12(i) of the pin) until meet bottoms of the vertical portions being beginnings of the horizontal portions of the corresponding L-shape notches 14 (FIG. 6c, view D). Thereafter, the operator turns the inner bowl 5 in relation to the outer bowl 1 until the pins 12 sliding within the horizontal portions of the corresponding L-shape notches 14 reach ends of the horizontal portions (position 12(ii) of the pin). In the position 12(ii), the outer bowl 1 fixes and supports the inner bowl 5 therein during operation. When the operator finishes using the ladle, she/he turns the inner bowl 5 in the opposite direction until the pins 12 reach the beginnings of the horizontal portions being the bottoms of the vertical portions (position 12(i) of the pin) of the L-shape notches 14, and then pulls the inner bowl 5 up until the pins 12 are extracted from the L-shape notches 14 and thereby the inner bowl 5 is separated from the outer bowl 1.

According to the fourth embodiment, the inner holes are disposed (at a level h6 shown in FIG. 6) predeterminedly below the upper edge (at a level h1 shown in FIG. 6) of the outer bowl 1 and predeterminedly above (at a level h2 shown in FIG. 6) the outer holes 2 of the outer bowl 1. This provides for better filtering of the undesirable components from the mixture (e.g. soup in a pot).

Exemplary Operation of an Embodiment of the Invention

An example of operation of the second embodiment depicted on FIGS. 3 and 3a follows. The ladle is submerged into a pot with mixture 8 containing undesirable components (e.g., fat, debris, sediments), so that the lower edges of grooves 6g are positioned below the surface level of mixture 8. The mixture 8 flows through the outer holes 2 of the bowl 1 into the gap 4, elevates to the level of the lower edges of grooves 6g, and through the grooves 6g flows into the inner bowl 5, until fills it up to the surface level of mixture 8 in the pot. While flowing through the holes 2, the undesirable components are caught by the outer holes 2, which undesirable components are filtered out and remain outside of the outer bowl 1, whereas the substantially filtered mixture is collected inside the inner bowl 5. Thusly, the user pours the filtered mixture out by a natural hand movement, for example into a plate. The user may scoop as many bowls of broth as he/she wants, and does not need to clean the bowls after each scoop from the undesirable components, saving time.

The structural principle disclosed above may also be applied to other devices, for example, intended to get more or less purified water from various sources, or to get a filtered fraction of other liquids containing certain kinds of impurities. External filter covers may be placed over the outer bowl and fixedly or removably attached thereto. Such filter covers may provide a predetermined purity of the filtered mixture.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A ladle for filtering a mixture with undesirable components, and obtaining an essentially filtered mixture by separating the undesirable components, substantially remaining in the mixture, while the filtered mixture is substantially collected in the ladle, said ladle comprising:

an outer bowl including a number of outer holes provided in a bottom region and/or in a middle region thereof, said outer bowl defines an outer upper region and an outer upper edge;

a handle attached to the outer bowl;

an inner bowl capable of being disposed within the outer bowl so that a predetermined gap is provided therebetween, said inner bowl defines an inner upper region and an inner upper edge; said inner bowl includes a plurality of protrusions respectively separated by a plurality of grooves circumferentially arranged in the upper region of the inner bowl, said plurality of grooves is disposed below the outer upper edge and above the outer holes;

wherein:

a number of selected protrusions, chosen from said plurality of protrusions, are provided with a corresponding number of pins respectively attached to the selected protrusions; and said outer upper region of the outer bowl is provided with a number of L-shape notches equal to said corresponding number of pins, each said L-shape notch is positioned in such a way that serves as a guide for the pin corresponding to the L-shape notch, when the inner bowl is inserted in the outer bowl during assembling of said ladle.

2. The ladle according to claim 1, wherein the inner bowl is provided with an inner outlet spout conjugated with one of the grooves and the outer bowl is provided with an outer outlet spout disposed in the outer upper region coaxially with the inner outlet spout, to ease pouring out the filtered mixture from the ladle.

3. A ladle for filtering a mixture with undesirable components, and obtaining an essentially filtered mixture by separating the undesirable components, substantially remaining in the mixture, while the filtered mixture is substantially collected in the ladle, said ladle comprising:

an outer bowl including a number of outer holes provided in a bottom region and/or in a middle region thereof, said outer bowl defines an outer upper region and an outer upper edge;

a handle attached to the outer bowl;

an inner bowl capable of being disposed within the outer bowl so that a predetermined gap is provided therebetween, said inner bowl defines an inner upper region and an inner upper edge, said inner bowl includes a number of inner holes provided in the inner upper region, disposed below the outer upper edge and above the outer holes;

wherein:

said outer bowl is provided with a number of pins circumferentially arranged in the upper region of the outer bowl; said inner bowl is provided with a number of L-shape notches circumferentially arranged in the upper region of the inner bowl; wherein the number of L-shape notches are equal to said number of pins; and wherein each said L-shape notch is positioned in such a way that serves as a guide for the pin corresponding to the L-shape notch, when the inner bowl is inserted in the outer bowl during assembling of said ladle.

4. The ladle according to claim 3, wherein the inner bowl is provided with an inner outlet spout and the outer bowl is provided with an outer outlet spout disposed in the outer upper region coaxially with the inner outlet spout, to ease pouring out the filtered mixture from the ladle.

\* \* \* \* \*